March 4, 1930. C. M. MEDAIRY 1,749,107
TRUCK
Filed June 14, 1928 4 Sheets-Sheet 1
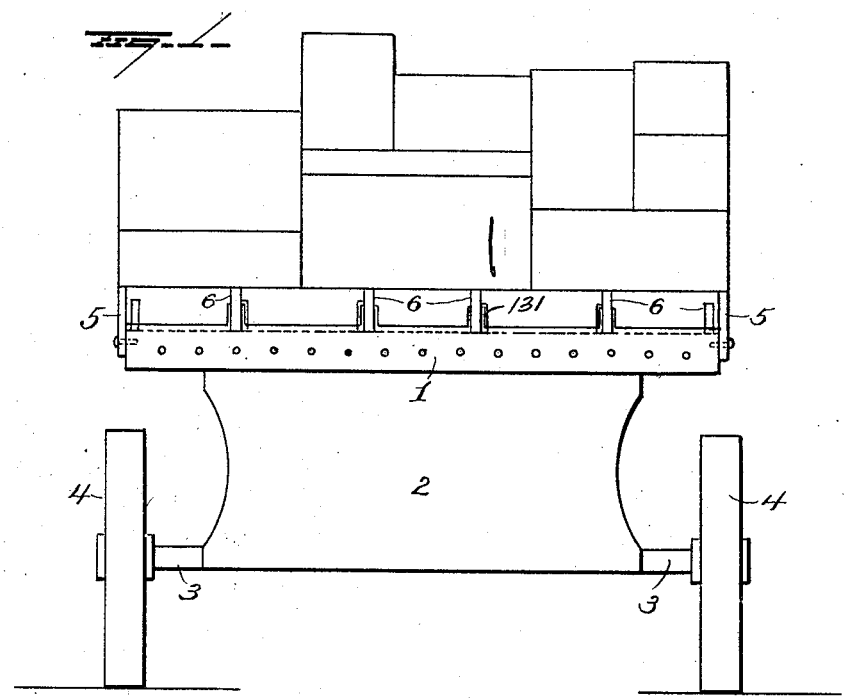
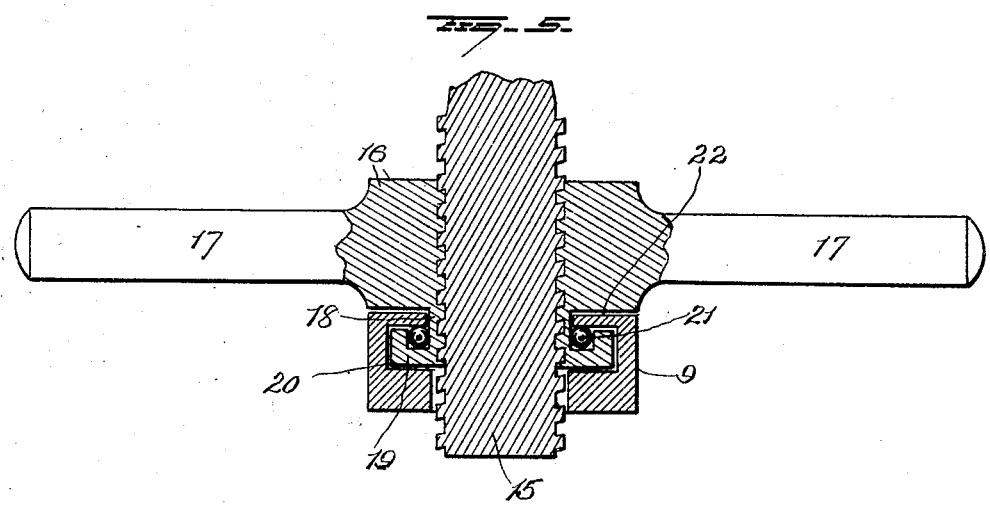
Inventor
C. M. Medairy
By Seymour & Bright
Attorneys

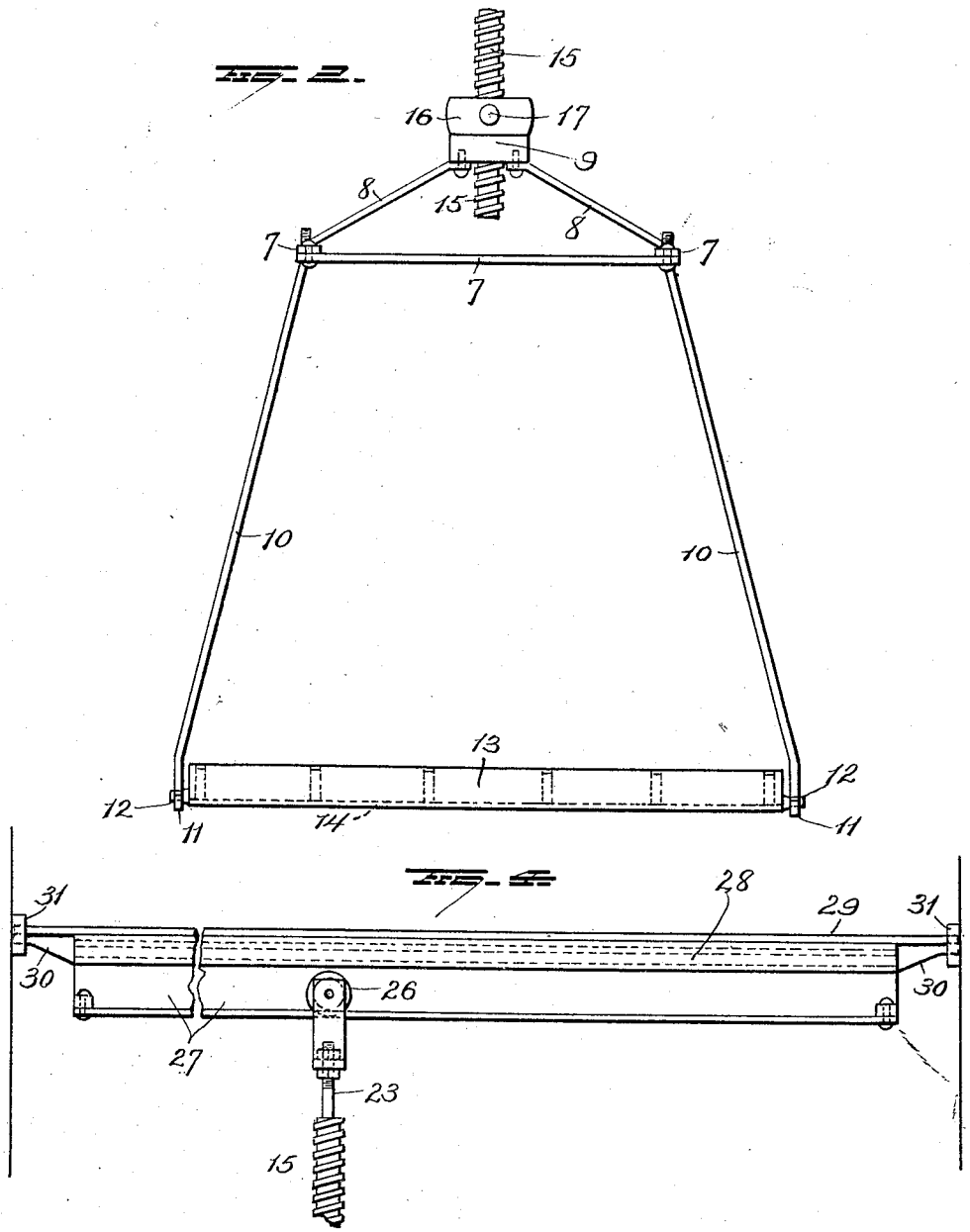

March 4, 1930. C. M. MEDAIRY 1,749,107
TRUCK
Filed June 14, 1928 4 Sheets-Sheet 3
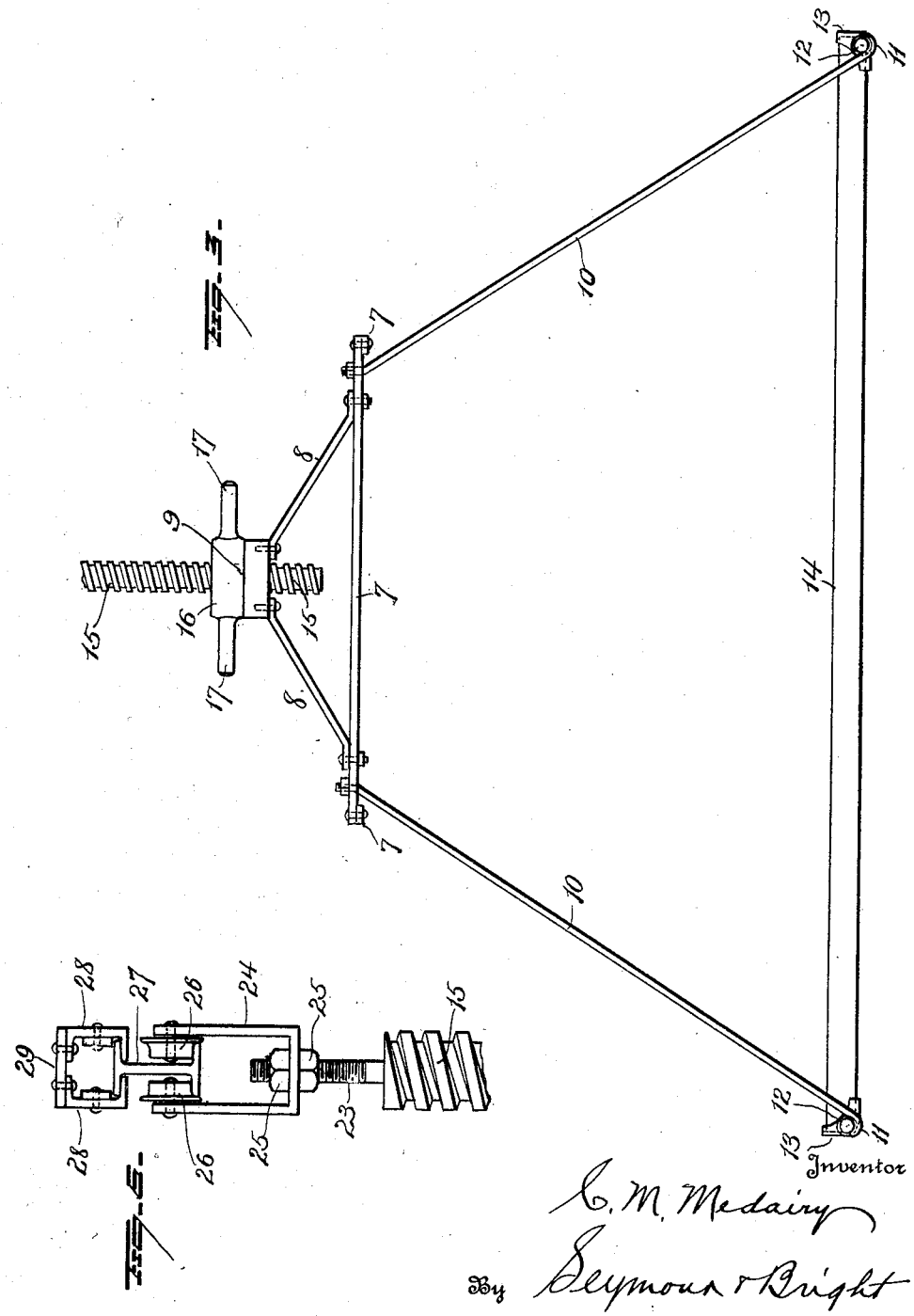

March 4, 1930.  C. M. MEDAIRY  1,749,107
TRUCK
Filed June 14, 1928    4 Sheets-Sheet 4
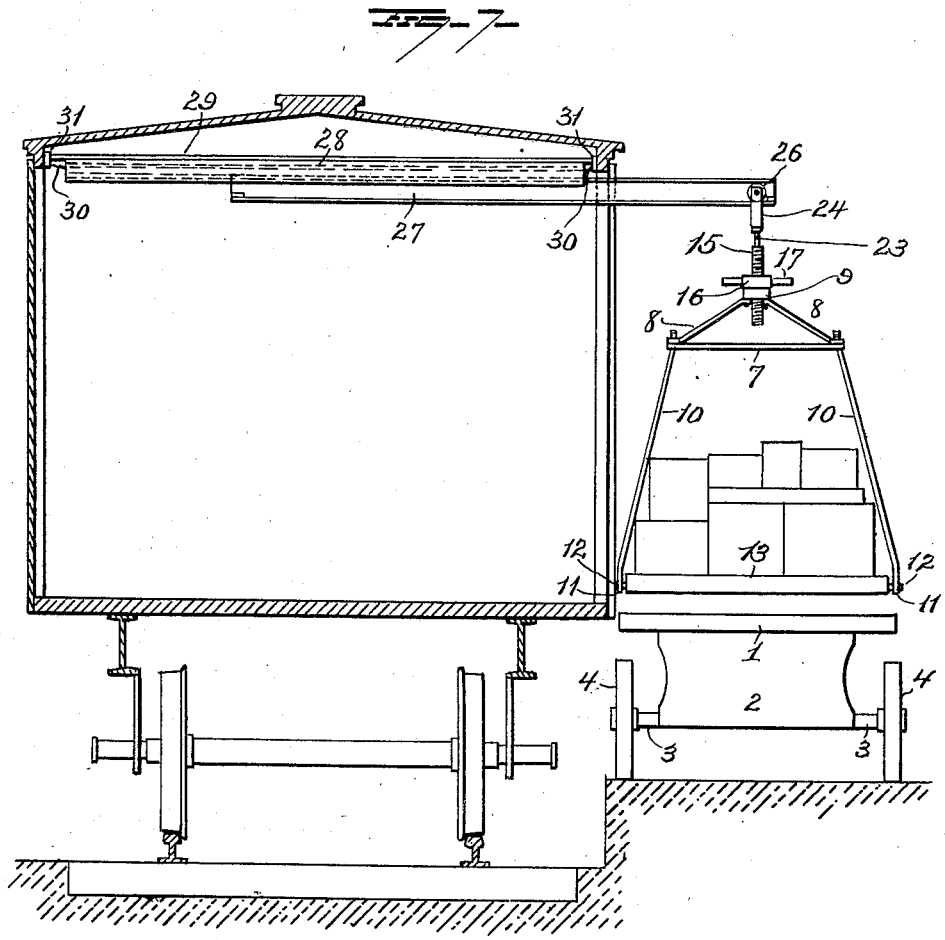
Inventor
C. M. Medairy
By Seymour & Bright
Attorneys Patented Mar. 4, 1930

1,749,107

UNITED STATES PATENT OFFICE

CHARLES M. MEDAIRY, OF CLEVELAND, OHIO

TRUCK

Application filed June 14, 1928. Serial No. 285,325.

This invention is a means for handling baggage, mail sacks, express packages, and the like, and the primary object is to facilitate the transfer of the packages from a truck to a car or from a car to a truck. Another object of the invention is to provide a carrier which may be easily disassembled and stored in a knock-down form and just as easily assembled for use. Another object is to provide a construction whereby a load may be built on a truck, a carrier engaged under the load, and the carrier then raised and shifted to lift the load from the truck and deliver it within a railroad car, or a carrier may be loaded in a car and, upon arrival at a station, caused to transfer the load to a waiting truck, the carrier being removed from under the load without disturbing the load. Other objects will appear incidentally in the course of the following description, and the invention resides in certain novel features which will be particularly pointed out in the appended claim.

In the drawings, Figure 1 is an end view of a truck loaded to receive a carrier;

Figure 2 is an end view of the carrier;

Figure 3 is a side view of the carrier;

Figure 4 is a detail transverse section of the load-supporting portions of the truck and the carrier, illustrating their relation when a load is to be transferred from one to the other;

Figure 5 is an enlarged detail section of the bearing for the carrier jack screw;

Figure 6 is an enlarged section of the traveling hanger for the jack screw.

Fig. 7 is a view showing the truck in position beside a car.

The truck comprises a platform 1 mounted on bolsters 2 secured upon axles 3 having wheels 4 fitted thereon. To the side edges of the platform are secured rails 5 and upon the top of the platform are secured parallel longitudinal rails 6 spaced apart transversely of the truck and of uniform height so that a load will be supported by the rails in spaced relation to the platform. The rails may be provided in any desired number and should be close enough together to support the packages and bundles piled on the truck but not so many as to interfere with the ready insertion of the carrier rails. It will be understood that the larger bundles will be placed on the rails, each bundle spanning at least two rails, and the smaller packages are piled on the larger ones. The outside rails 5 are permanently secured to the truck platform so that they will not turn and impart to the load a tendency to upset as the carrier is being raised and lowered, but the inner rails are removable and may be suspended in any convenient manner beneath the platform to permit use of the truck for other purposes.

The carrier consists of a basket or load-supporting structure and means for raising, lowering and bodily shifting the same. The basket comprises upper bars 7 rigidly secured together, preferably in rectangular relation, and suspension rods 8 connecting them with a head 9 which is preferably made in sections bolted together so that it may be easily assembled with other parts. Rigidly secured to the ends of the frame bars 7 and diverging downwardly therefrom are hangers 10 having their lower ends formed into or equipped with hooks 11 to receive studs or lugs 12 on the ends of the carrier end bars 13 which are L-shaped in cross-section so that they form seats and stops for the ends of the carrier rails 14. The carrier rails 14 are of the same form as the truck rails 6 but are of less height so that they may be easily inserted endwise under a load on the truck, and they rest at their ends free in the seats provided by the end bars 13 so that they may be easily removed or replaced when desired.

The head or collar 9 has a central opening therethrough to accommodate the hoisting screw 15 which is formed with a coarse thread and upon which is mounted an adjusting nut 16 having oppositely projecting handles 17. On the underside of the nut is formed a sleeve extension 18 terminating in a race ring 19 which enters an annular recess or chamber 20 in the head or collar 9, bearing balls 21 being disposed in the race ring below the top wall or flange 22 of the collar. The carrier is thus firmly supported by the screw and nut while the nut turns in the collar or head with minimum friction.

The hoisting screw 15 is reduced in diameter at its upper extremity, as shown at 23, and this reduced extremity is engaged through an opening provided therefor in the lower end of a traveler yoke 24 and secured by clamping lock nuts 25. The upper end of the yoke is equipped on its inner sides with rollers 26 which run on the lower flanges of an I-bar track 27, the upper flanges of said I-bar being engaged between and over the lower flanges of a beam consisting of two channel bars 28 having their channels facing and having their upper flanges rigidly secured to a main supporting bar 29. Reenforcing webs 30 may connect the ends of the channel bars 28 with the projecting ends of the main bar 29, said projecting ends being engaged in sockets 31 secured upon the walls of the car just above the door openings so that the beam, when in place, will extend between the sides of the car.

While the load may be piled on and supported directly by the rails on the truck, it may be more convenient to place a temporary platform or shelf, indicated at 131, over the rails and a similar platform will be provided in the car. It is also to be understood that the ends of the beam 29 are easily lifted from the sockets 31 so that the carrier may be dismantled and set aside when a long period of non-use is entered upon, and racks may be provided on the walls of the car to receive the dismantled parts of the carrier.

A load to be shifted may be arranged on the truck and may be covered with a tarpaulin to protect packages from falling from the truck when being drawn from the depot to the car and for protection from the weather pending the arrival of the train for which the shipment is intended, the loaded truck being moved to a position beside the track. When the train arrives, the track 27 is slid out sufficiently to permit the carrier to be centered over the truck, whereupon the nut 16 is rotated about the screw 15 to ride downwardly thereon and lower the carrier to the truck. The carrier rails are inserted endwise under the load and between the rails on the truck, and seated in the end bars of the carrier. The nut 16 is then rotated so as to ride upwardly on the screw 15, thereby raising the carrier, and as the rails of the carrier engage the load, the load will be transferred from the truck to the carrier. As soon as the carrier has been raised high enough to clear the door sill, the traveler is shifted along the track to bring the carrier into the car for unloading. To save time, it is desirable to provide several sets of carrier rails, and temporary platforms where the platforms are used, so that all the rails may be placed in position when loading the truck in anticipation of the arrival of the train. Then, when the train arrives, all that need be done is to engage the hooks of the hangers under the lugs of the carrier end bars and raise the carrier and load from the truck. It may also be found desirable to provide a large number of sets of rails so that a number of trucks may be loaded and placed in position to have their loads transferred to the car in succession. A load to be shifted may be arranged on the carrier platform in the car and may be covered with a tarpaulin to protect packages from falling from the truck when being drawn from the car to the depot and for protection from the weather. Upon arrival, the carrier is moved out through the car doorway and centered over and lowered to an empty truck. The carrier strips may be manually drawn from under the load after the same has reached the truck rails, or the forward end bar may be withdrawn and the truck then driven forward so that the carrier rails will be simultaneously withdrawn by reason of their engagement with the rear end bar of the carrier. It may also be found desirable to provide more than one platform or set of carrier rails so that while one load is being delivered onto a truck by the carrier, another load may be prepared in the car for such delivery.

Having fully described my invention what I claim as new and desire to secure by Letters Patent, is:—

Means for the purpose set forth including a pair of angle bars having studs at their ends, load-sustaining rails having their ends seated freely on said angle bars, a frame, hangers secured to and diverging downwardly from the corners of said frame and provided at their lower ends with hooks engaging the studs on the angle bars, a head above the frame constructed to cooperatively engage a hoisting element, and suspension rods connecting the head with the corners of the frame, the frame consisting of bars rigidly secured together in rectangular relation.

In testimony whereof, I have signed this specification.

CHARLES M. MEDAIRY.